United States Patent
Benson et al.

(10) Patent No.: US 9,948,740 B1
(45) Date of Patent: Apr. 17, 2018

(54) CACHING FOR MULTI-PROTOCOL MEDIA CONTENT DELIVERY

(71) Applicant: Amazon Technologies, Inc., Seattle, WA (US)

(72) Inventors: Nicholas James Benson, Seattle, WA (US); Srikanth Kiran Kotagiri, Redmond, WA (US); Joshua B. Barnard, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 589 days.

(21) Appl. No.: 14/549,434

(22) Filed: Nov. 20, 2014

(51) Int. Cl.
*H04L 29/08* (2006.01)
*H04L 29/06* (2006.01)

(52) U.S. Cl.
CPC .......... *H04L 67/2842* (2013.01); *H04L 65/60* (2013.01)

(58) Field of Classification Search
None
See application file for complete search history.

(56) References Cited

U.S. PATENT DOCUMENTS

| 2004/0015538 A1* | 1/2004 | Agarwalla | G06F 17/30905 |
| | | | 709/203 |
| 2013/0275549 A1* | 10/2013 | Field | G06F 17/30887 |
| | | | 709/217 |
| 2015/0304444 A1* | 10/2015 | Lundborg | H04L 67/2842 |
| | | | 709/213 |

* cited by examiner

*Primary Examiner* — Jeffrey R Swearingen
(74) *Attorney, Agent, or Firm* — Weaver Austin Villeneuve & Sampson LLP (57) ABSTRACT

Techniques are described caching media content. The caching can provide the same cached media content to multiple requests based on different protocols.

20 Claims, 5 Drawing Sheets

CACHING FOR MULTI-PROTOCOL MEDIA CONTENT DELIVERY

BACKGROUND

Consumers have an ever-increasing array of options for consuming media content, in terms of the types of media content (e.g., video, audio, etc.), providers of the media content, and devices for consuming the media content. Media content providers are becoming increasingly sophisticated and effective at providing media content quickly and reliably to consumers. Success in the marketplace will depend in part on the ability of media content providers to effectively provide media content to a wide range of devices used by consumers.

Different devices and/or software may request the same media content using different protocols. The requests are received by an edge server of a content distribution network (CDN) which, if it does not have the requested fragments in its cache, retrieves them from an origin server and then caches the fragments for servicing of subsequent requests. Unfortunately, because client requests in different protocols have distinct formatting, the CDN does not recognize when the requests correspond to the same content, resulting in redundant caching.

DETAILED DESCRIPTION

This disclosure describes techniques for caching media content that provide for efficient delivery of the media content to consumers. More specifically, these techniques enable a single cached copy of media content to be used to service client requests that are formatted according to different protocols. For example, one client might use Microsoft Smooth Streaming to request a video fragment while another uses MPEG-DASH. One of the requests can be translated from one format to the other thereby allowing the content to be cached once and accessed using multiple protocols. Some examples will be illustrative.

Figure 1:
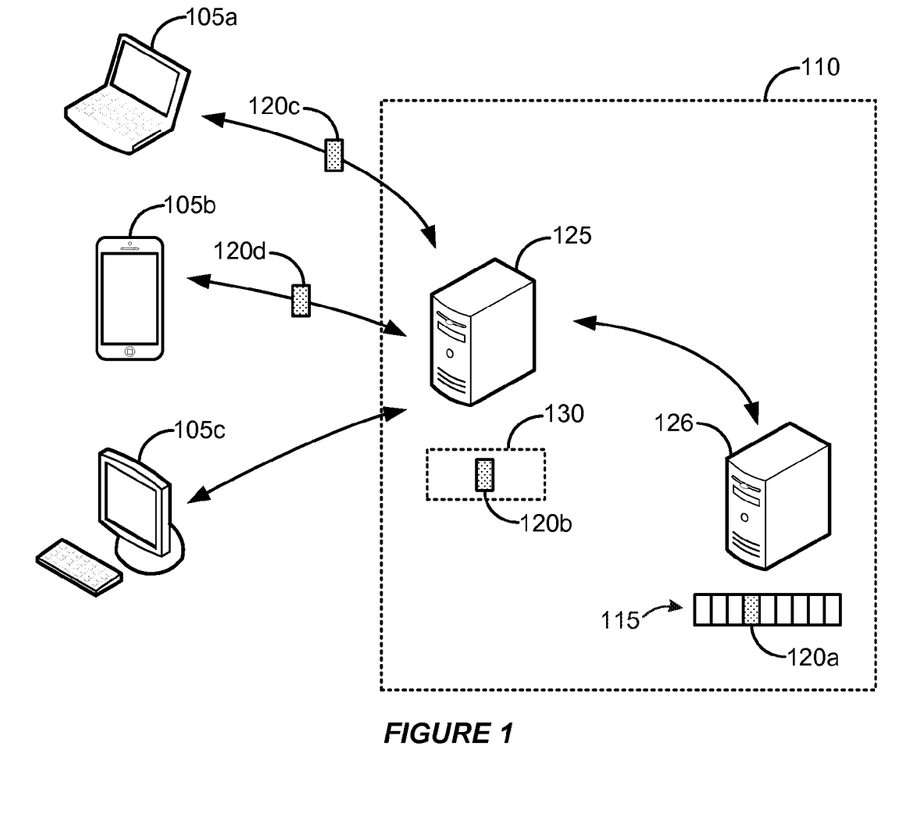
FIG. 1 shows an example of a content distribution network (CDN).

As shown in FIG. 1, devices 105a, 105b, and 105c request media content from content delivery network (CDN) 110. Each of the devices uses a different protocol to request a stream of fragments of the media content (i.e., smaller portions of a larger media content file) for playback. In this example, device 105a is a laptop requesting media content with a web browser using the Microsoft Smooth Streaming protocol, and device 105b is a smartphone requesting media content with an app using the MPEG-DASH protocol. Other devices that request content that may be delivered as described herein may include, for example, mobile devices (e.g., tablets), set top boxes (e.g., for cable and satellite systems), smart televisions, gaming consoles, wearable computing devices (e.g., smart watches), etc.

The different protocols used by devices 105a, 105b, and 105c request the same media content using different mechanisms. For example, in the Microsoft Smooth Streaming protocol, media content is requested in a format resembling "URL/file/quality/start time" (e.g., http://www.example.org/content/0a448472/0a448472-9c8d-4ecb-a361-de2b73254dd7.ism/QualityLevels(450000)/Fragments (video=0)). That is, the Microsoft Smooth Streaming protocol requests a particular fragment of media content by indicating a particular start time of a time range for the fragment in a certain quality level (e.g., the fragment beginning at 0 seconds and ending at 2 seconds based on video=0 and at a quality level associated with a bit rate of 450 kbps based on QualityLevels(450000) in the example) within the media content file including the requested fragment. As another example, http://www.example.org/content/0a448472/0a448472-9c8d-4ecb-a361-de2b73254dd7.ism/QualityLevels(450000)/Fragments(video=20020000) indicates the fragment starting at 2 seconds (indicated by video=2002000) and ending at 4 seconds at the same quality level. By contrast, the MPEG-DASH protocol requests same fragment of media content by indicating a memory range in an HTTP header. For example, in the MPEG-DASH protocol, media content is requested in a format having a URL with an HTTP header indicating a byte range (e.g., http://www.example.org/content/0a448472-9c8d-4ecb-a361-de2b73254dd7/video_450 kbps.ismv with an HTTP header including data indicating bytes=2889-195610). In this example, a byte range from byte 2889 to byte 195610 indicates the same fragment of media content as the fragment beginning at 0 seconds and ending at 2 seconds in the 450 kbps quality level. This shows how two different protocols can reference the same fragment of media content through different indexing types.

As an example, media content 115 represents a complete media content file (e.g., episode #1, titled "Express to Terror," of the 1979 television drama series Supertrain) stored on origin server 126. In FIG. 1, origin server 126 serves as a central repository for digital storage of a library of media content (including episodes of television shows, movies, music, subtitles, etc.), including media content 115. Media content 115 is broken into several fragments, including fragment 120a.

A user can use device 105a to navigate through a web-based catalog of the library of media content from an online media delivery service, select episode #1 of Supertrain to watch, and fast-forward to skip the opening title sequence. Fragment 120a may represent the fragment beginning approximately at the point the user has forwarded to, for example, represented as being the time range of 45 seconds to 50 seconds. As a result, fragment 120a might be provided to device 105a for playback. More typically, origin server 126 provides a copy of fragment 120a to edge server 125 to store in cache 130 as fragment 120b. Edge server 125 then provides a copy of fragment 120b to device 105a as fragment 120c. Additional fragments of media content 115 may also be provided to device 105a such that a "stream" of fragments is provided to device 105a to provide a seamless playback of all or a portion of media content 115.

Cache 130 of edge server 125 allows for copies of recently-requested fragments to be closer to devices 105a, 105b, and 105c, and therefore, provides a closer source for media content than origin server 126. In particular, the next time fragment 120a is requested, fragment 120b in cache 130 can be provided rather than fetching fragment 120a from origin server 126. For example, if device 105*b* requests fragment 120*a*, a copy of fragment 120*b* (i.e., a copy of fragment 120*a* stored closer in cache 130 of edge server 125) can be provided to device 105*b* as fragment 120*d*.

However, as mentioned above, if device 105*b* requests fragment 120*a* using a different protocol than device 105*a*, fragment 120*b* in cache 130 may not be recognized as corresponding to device 105*b*'s request. For example, if fragment 120*b* was originally requested according to a protocol that uses time indexing, such as by start time (e.g., Smooth Streaming) and device 105*b* uses a protocol that uses memory range indexing (e.g., MPEG-DASH), fragment 120*b* would not be recognized using conventional techniques as being the same fragment targeted by device 105*b*'s request. As a result, another copy of fragment 120*a* associated with memory indexing (e.g., byte range) would need to be stored in cache 130. This increases storage requirements of edge server 125 since multiple copies of fragment 120*a* are stored in cache 130. Moreover, since device 105*b* is provided a copy of fragment 120*a* from origin server 126 rather than edge server 125 (i.e., a server higher up, or farther away, in the hierarchy of CDN 110 from device 105*b*), the requested fragment may not be provided to device 105*b* as quickly.

Figure 2:
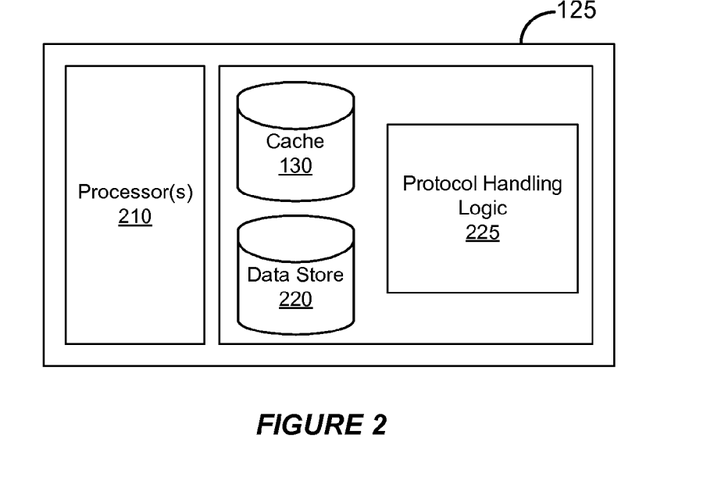
FIG. 2 illustrates an example of a computing environment for a server used to cache media content.

FIG. 2 illustrates an example of a computing environment for a server used to cache media content. The computing environment of FIG. 2 represents edge server 125 which can be used to provide the same fragment of media content in the cache for multiple protocols.

It should also be noted that, despite references to particular computing paradigms and software tools herein, the computer program instructions on which various implementations are based may correspond to any of a wide variety of programming languages, software tools and data formats, may be stored in any type of non-transitory computer-readable storage media or memory device(s), and may be executed according to a variety of computing models including, for example, a client/server model, a peer-to-peer model, on a stand-alone computing device, or according to a distributed computing model in which various functionalities may be effected or employed at different locations. In addition, reference to particular protocols herein are merely by way of example. Suitable alternatives known to those of skill in the art may be employed.

Edge server 125 may be part of a content delivery system that conforms to any of a wide variety of architectures including, for example, a CDN 110 with servers deployed at one or more geographic locations (e.g., across different countries, states, cities, etc.). CDN 110 can include a distributed system of servers including edge server 125 and origin server 126 deployed in multiple data centers across a network such as any subset or combination of a wide variety of network environments including, for example, TCP/IP-based networks, telecommunications networks, wireless networks, cable networks, public networks, private networks, wide area networks, local area networks, the Internet, the World Wide Web, intranets, extranets, etc.

CDN 110 may include a hierarchy of servers including edge server 125, origin server 126, and a variety of servers in between edge server 125 and origin server 126. For example, a "middle tier" between edge server 125 and origin server 126 can provide an intermediate level of caching and other functionality. Though the implementation described herein provides the same fragment of media content in the cache for multiple protocols at edge server 125, in other implementations, the functionality may be provided elsewhere within the CDN 110. For example, the functionality may be provided by origin server 126 and/or in between origin server 126 and edge server 125. Moreover, multiple layers of caching may be provided. For example, the functionality may be in both edge server 125 and origin server 126. It should be noted that, while edge server 125 and origin server 126 are contemplated as part of a CDN, implementations are contemplated in which either or both operate remotely from the CDN, and/or either or both are under the control of an independent entity.

Edge server 125 can include various types of logic used to provide media content for playback. In addition, edge server 125 includes cache 130, data store 220, and protocol handling logic 225. Cache 130 stores fragments of media content that have previously been requested (e.g., by devices 105*a*, 105*b*, and 105*c*). The content stored in cache 130 may be based on a variety of caching algorithms implemented by edge server 125, for example, the most recently requested fragments of media content 115. However, other caching algorithms may also be implemented. Edge server 125 can also include one or more processors, memory, and other hardware for performing the tasks disclosed herein.

Data store 220 stores additional data other than fragments of media content, for example, cache keys, manifests for media content, and other types of data used by protocol handling logic 225 to allow for a cached media content fragment to be used to service requests formatted according to multiple protocols as described herein.

A specific implementation will now be described with reference to the computing environment of FIG. 2, the flow diagram of FIG. 3, and the manifests of FIG. 4. In the depicted implementation, a user selects media content for playback on a device, for example, by selecting a video for playback from a video streaming service (305). In some implementations, when the user selects a particular video to play, the device will use a manifest file including metadata that allows the device to generate properly formatted requests for specific fragments of media content. For example, if the device is using a video client that requests media content under the Microsoft Smooth Streaming protocol, then the manifest indicates the various fragments of the media content that can be provided based on the Microsoft Smooth Streaming protocol. For example, in FIG. 4, manifest 405*a* represents a manifest for episode #1 of Supertrain in the Microsoft Smooth Streaming protocol. The manifest can include all of the fragments that together make the full media content (i.e., episode #1 of Supertrain). Different combinations of conditions (e.g., video quality, audio quality) can indicate different segmentation of the media content into individual fragments. In FIG. 4, media content 115 is indicated as including 19 fragments including fragment 410*a* (indexed as starting at 8 seconds and ending at 10 seconds in manifest 405*a*) and 410*b* (indexed as starting at 18 seconds and ending at 20 seconds in manifest 405*a*) if played at the 1080p quality level. Other quality levels or conditions may have a different number of fragments and different time indices for the fragments.

The manifest may be requested by the device and provided by any component of CDN 110 (e.g., edge server 125 or origin server 126). In other implementations, the manifest may already be on the device, may be retrieved from another source such as a webpage, etc. In any case, the device uses a manifest that can be used to generate requests (e.g., form the appropriate URLs specifying the particular starting time of the associated time range) for fragments of media content 115.

The manifests may be provided in a variety of formats. In some implementations, manifests are an Extensible Markup Language (XML) formatted document.

Edge server 125 receives the request for the fragment of media content 115 (e.g., fragment 410a as specified by start time) and determines if the fragment is already within cache 130 (310). In particular, edge server 125 calculates a cache key based on the request to determine if the fragment is already in cache 130. For example, if the request is http://www.example.org/content/0a448472/0a448472-9c8d-4ecb-a361-de2b73254dd7.ism/QualityLevels(450000)/Fragments(video=0), then the URL can be salted with additional data to generate a unique cache key as an identifier associated with the fragment identified in the URL (i.e., the fragment starting at 0 seconds) that can be used, for example, in a hashing function or data structure to associate with the fragment. Each fragment of the media content having different time ranges would result in a different cache key. Data indicating an association between a cache key and a fragment in cache 130 can be stored in data store 220.

If the fragment associated with the start time is already in the cache (e.g., as indicated by an existing association with the cache key), then the fragment can be quickly provided to the user device. For example, edge server 125 may look into data store 220 and/or cache 130 to see if fragment 405a associated with a start time of 8 seconds is already stored. However, if the fragment is not in cache 130, then origin server 126 is contacted to retrieve the fragment and provide it to edge server 125 (315). When edge server 125 receives the fragment from origin server 126, it may be stored in cache 130 (320). Additionally, the fragment is provided to the device for playback (325).

Next, another request for the video fragment can be issued (330). For example, another device can request the same fragment (e.g., fragment 410a) also using the same Microsoft Smooth Streaming protocol. Since the request would be formed the same as the prior request (e.g., with the same URL indicating the same start time), then the same cache key would be used. Edge server 125 can determine if fragment 405a indexed by time (i.e., starting at 8 seconds and ending at 10 seconds) is already in cache 130 (335), and if so, retrieve the stored fragment from the cache and provide the fragment to the device (337). As a result, the device receives the fragment for playback (340). Since fragment 405a was already in cache 130 due to a prior device requesting it, edge server 125 does not need to contact origin server 126 for another copy of the fragment.

However, if the request in block 330 was issued in another protocol, for example, the MPEG-DASH protocol, then the existing copy of fragment 410a associated with time indexing of a start time of 8 seconds may not be recognized as the same fragment being requested because the request would be formed differently (e.g., a different URL or HTTP header indicating a byte range), and therefore, a different cache key would be used. In particular, since MPEG-DASH uses byte indexing, the time indexed fragment would not be recognized as being the equivalent to the fragment requested under byte indexing due to the requests resulting in different cache keys.

For example, in FIG. 4, manifest 405b is also a manifest for episode #1 of Supertrain. By contrast to the manifest of 405a (i.e., a time indexed manifest), manifest 405b indexes the fragment in terms of byte range. Both manifests 405a and 405b refer to media content 115 as having 19 fragments if played at the 1080p quality level, however, the fragments are referred to in different manners. That is, manifest 405a specifies the fragments in terms of start times of time ranges and manifest 405b specifies the same fragments in terms of byte range. Requesting a fragment from the time range of 8 seconds to 10 seconds in Microsoft Smooth Streaming is the same as the fragment from the byte range of the $1200^{th}$ byte to the $1400^{th}$ byte in MPEG-DASH. That is, fragment E in manifest 405a and fragment 5 in manifest 405b both point to the same fragment 410a of media content 115. Likewise, fragment J in manifest 405a and fragment 10 in manifest 405b both point to the same fragment 410b of media content 115.

If manifest 405a is used to request fragment 410a and a copy of fragment 410a is stored in cache 130, followed by another request for fragment 410a using manifest 405b, then the existing copy of fragment 410a stored in cache 130 would not be recognized as being for the same fragment (due to the different indexing resulting in a different URL), and therefore, edge server 125 would retrieve a second copy of the fragment to store in the cache associated with the byte range of the fragment.

Figure 5A:
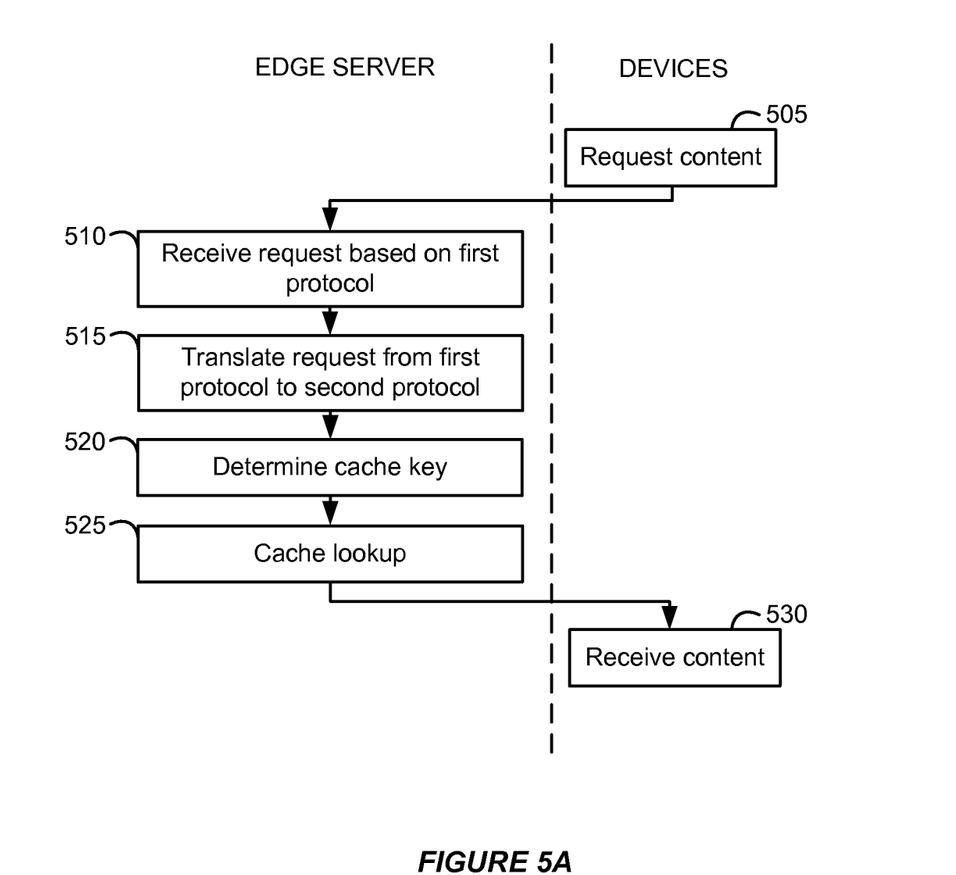
FIG. 5A is a flowchart illustrating an operation of a cache of a CDN with multi-protocol media content delivery.

FIG. 5A is a flowchart illustrating an operation of a cache of a CDN with multi-protocol media content delivery. Multi-protocol media content delivery allows for a single fragment stored in cache 130 to be provided in response to requests formatted according to different protocols. For example, if fragment 410a is stored in cache 130 following a request formatted according to the Microsoft Smooth Streaming protocol using time indexing, a second request for fragment 410a formatted according to MPEG-DASH using byte indexing can be serviced using the copy of fragment 410a stored in cache 130 rather than obtaining a second copy of fragment 410a to store in cache 130 and associated with byte indexing.

In FIG. 5A, requests in one protocol (e.g., Microsoft Smooth Streaming) can be translated to another protocol (e.g., MPEG-DASH) to ensure that the same copy of a fragment in cache 130 is provided to both types of requests. Though the example herein discusses converting requests using one protocol to another protocol, in other scenarios, requests using multiple other protocols may be translated to a single protocol.

As previously discussed, a device can request a video using the Microsoft Smooth Streaming protocol (505). Edge server 125 receives the request based on the protocol (510). The request is parsed and analyzed to determine the type of protocol used in the request. Differences between how the different protocols format the URLs and data provided in the HTTP headers for the requests can be used to determine the particular protocol being used, for example, by having differences in the query string, file names, directory structure, or other parts of the URL, HTTP header, or any other type of data provided with the request. After identification of the protocol used in the request, it can be determined whether the request should be translated if the request does not use a specific protocol (e.g., MPEG-DASH) used by edge server 125 in its functionality with respect to cache 130. As a result, rather than determining the cache key for the request under the Microsoft Smooth Streaming protocol and then determining if the fragment associated with the cache key is in cache 130, the request can be translated into another protocol, for example, MPEG-DASH (515). That is, the time range in the request can be translated to a byte range request to convert the URL to an MPEG-DASH request from a Microsoft Smooth Streaming request.

After the request has been translated, the cache key for the translated request can be determined, as previously discussed (520). As a result, the fragment may be retrieved from the cache (525) and provided to the device (530).

Figure 3:
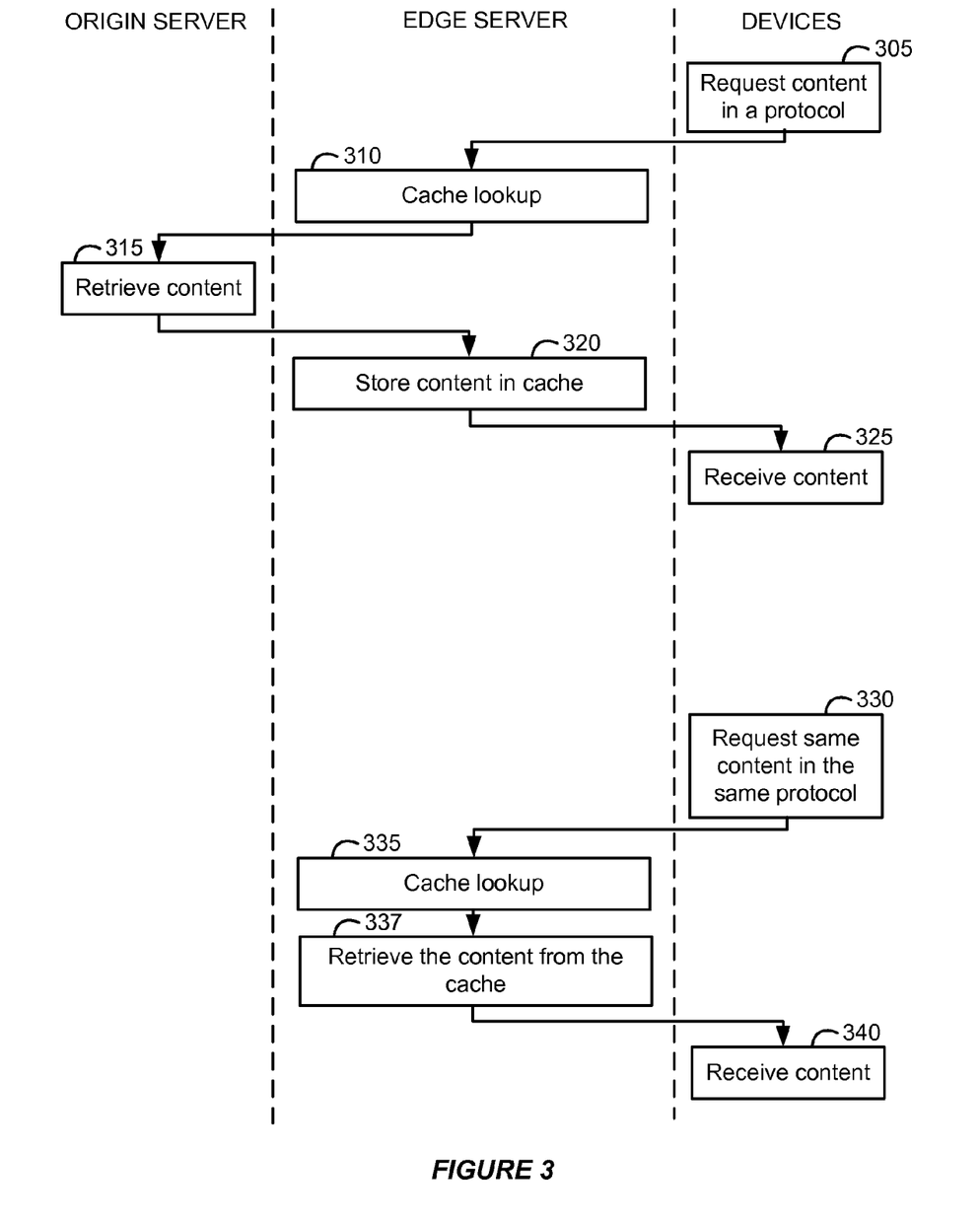
FIG. 3 is a flowchart illustrating an operation of a cache of a CDN.
Figure 4:
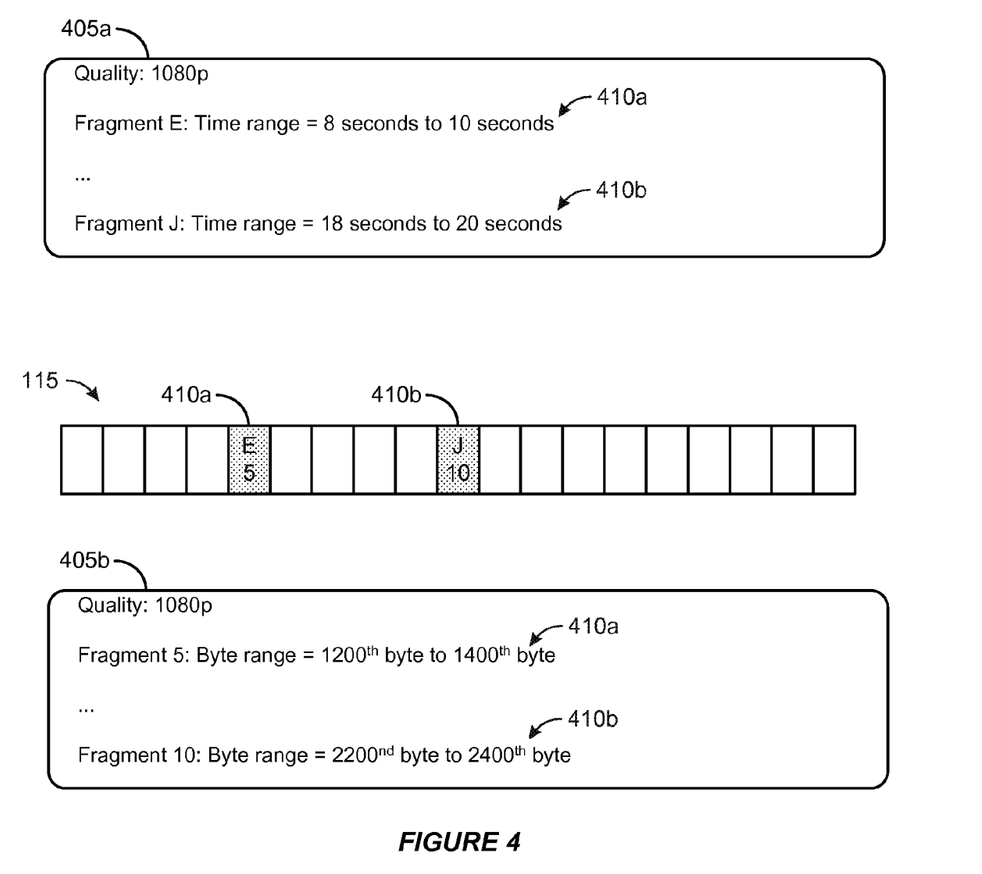
FIG. 4 illustrates an example of different media protocols referencing the same media content.

Alternatively, if the fragment is not in the cache, then the fragment may be retrieved from origin server 126 similar to the process in FIG. 3.

The example of FIG. 5A allows for a "thin" layer of software to be installed (e.g., as a separate software program, part of the operating system, or cache 130) at edge server 125 that translates the URL. In some implementations, edge server 126 can translate between the URLs and HTTP headers used by the different protocols by using the manifests. For example, referring back to FIG. 4, manifests 405*a* and 405*b* can be stored in data store 220. If Microsoft Smooth Streaming requests are to be converted to MPEG-DASH requests by edge server 125, the metadata in manifest 405*a* can be mapped to the metadata in manifest 405*b* to translate the request (in Microsoft Smooth Streaming) into the new request (in MPEG-DASH). For example, the fifth fragment in manifest 405*a* (i.e., fragment E) used by Microsoft Smooth Streaming is equivalent to the fifth fragment in manifest 405*b* (i.e., fragment 5) used by MPEG-DASH. As a result, the start time associated with a time range in the URL can be replaced with the byte range by finding the equivalence between the fifth fragments between the two manifests. That is, a time range starting at 8 seconds and ending at 10 seconds can be translated as a byte range of the $1200^{th}$ byte to the $1400^{th}$ byte. The cache key can then be determined after the request is translated. The other fragments can also be similarly mapped between manifests 405*a* and 405*b*.

In some implementations, when edge server 125 receives a fragment from origin server 126, the manifests for the media content associated with the fragment can also be provided to edge server 125. For example, if edge server 125 requests a fragment from episode #1 of Supertrain, origin server 126 provides the fragment along with the manifests (for all of the protocols). In some implementations, if a previously-requested fragment of episode #1 of Supertrain is already in cache 130, then edge server 125 requests another fragment and not the manifests because the manifests are already stored by edge server 125. That is, the manifests have been previously received by edge server 125 based on a request for another fragment, and therefore, another request to receive the manifests is unnecessary.

In some implementations, the fragments are packaged in a file (e.g., a container file or wrapper format) that also includes other data such as a header that can be unique to the protocol associated with the request issued by the device. Thus, when a device requests a fragment in one protocol that gets translated to a second protocol and the fragment is retrieved from cache 130, the header based on the first protocol can be provided with the fragment in the packaged file rather than a header based on the second protocol. In this way, edge server 125 can provide data to the device without the device knowing that edge server 125 has performed any sort of translation between requests.

In some implementations, edge server 125 may include headers for more than one protocol in the packaged file. For example, every request from a device regardless of the particular protocol would result in edge server 125 providing a packaged file including headers for Microsoft Smooth Streaming and MPEG-DASH. The device may then ignore all of the headers other than the header associated with the protocol that it uses.

Figure 5B:
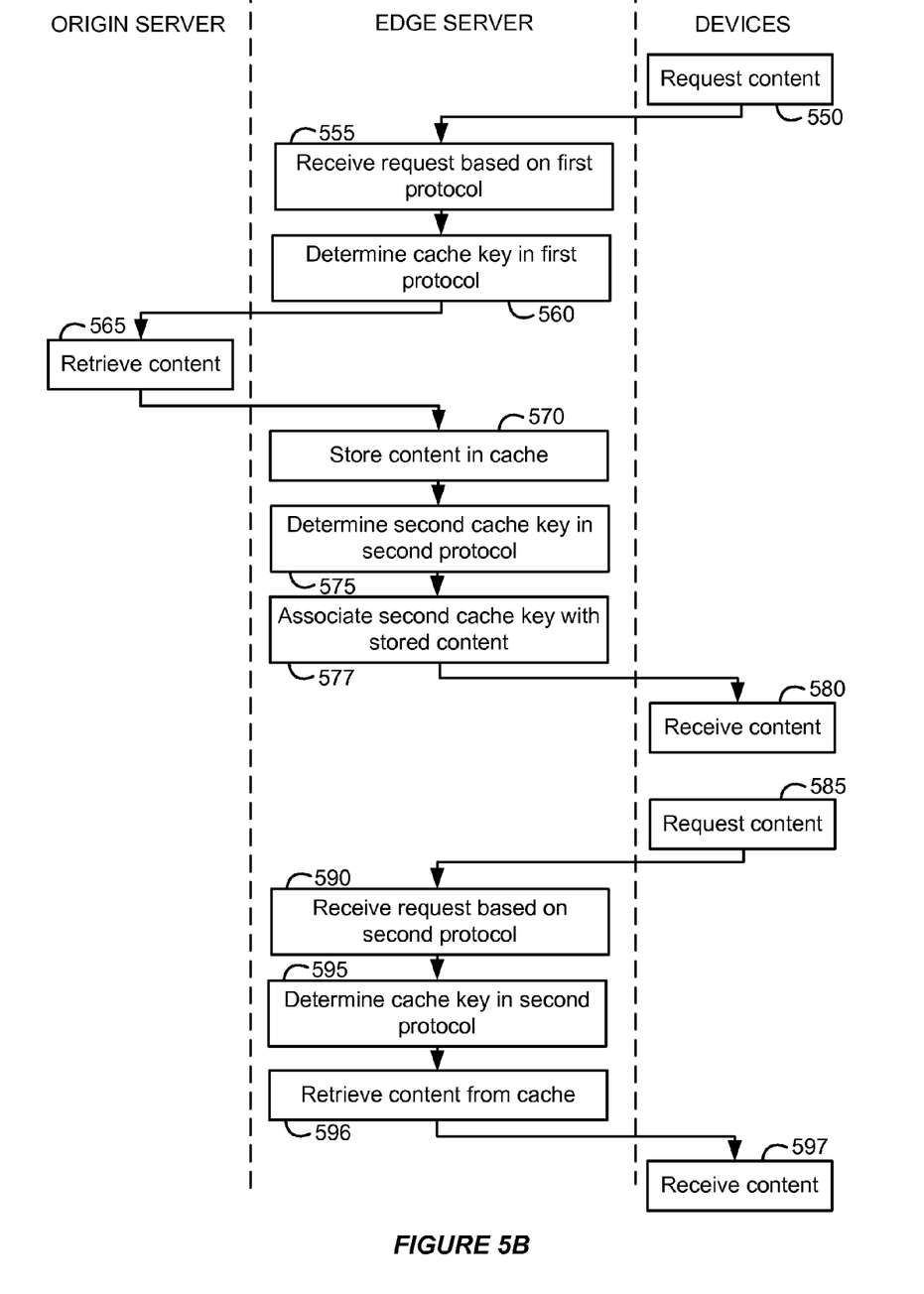
FIG. 5B is another flowchart illustrating an operation of a cache of a CDN with multi-protocol media content delivery.

FIG. 5B is another flowchart illustrating an operation of a cache of a CDN with multi-protocol media content delivery. In FIG. 5B, a request in one protocol can generate the cache keys for both protocols and associate both cache keys with the fragment stored in cache 130.

In FIG. 5B, a device can request a fragment of a video by issuing a request using a particular protocol, for example, Microsoft Smooth Streaming (550). Edge server 125 receives the request (555). After receiving the request, edge server 125 determines the cache key for the request in the first protocol (560). If the fragment associated with the request is not in cache 130, for example, based on a missing association between the cache key and the fragment in cache 130 as previously discussed, then edge server 125 obtains the fragment from origin server 126 (565). The fragment is then stored in cache 130 (570). Additionally, the cache key for the fragment based on a request on another protocol, for example, MPEG-DASH can also be determined and associated with the fragment (575). In some implementations, the request in the first protocol would be translated into the second protocol and then used to determine the cache key in the second protocol. As a result, the fragment stored in cache 130 is associated with two different cache keys: one for Microsoft Smooth Streaming and one for MPEG-DASH (577). The device receives the fragment of the video after edge server 125 receives the fragment from origin server 126 (580).

Next, another request for the fragment can be issued, for example in the MPEG-DASH protocol, by a device (585). Edge server 125 receives the request for the fragment (590). Edge server 125 can determine the cache key for the request based on a protocol other than the protocol from the first request (595). Since the cache key is already associated with the fragment in cache 130 (based on the operations of edge server 125 from the prior request 550), the cached fragment can be retrieved rather than requesting the fragment from origin server 126 (596). The device can then receive the fragment of the video (597).

Any sort of protocols and indexing types can be used by the techniques disclosed herein. Time indexing (e.g., time range, start times), memory indexing (e.g., byte range, start bytes), fragment indexing (e.g., a particular fragment number or identifier) may be used.

In some implementations, edge server 125 can track the number of requests received using different protocols and adjust the translation of a request from one protocol to another protocol. For example, edge server 125 may translate requests from Microsoft Smooth Streaming to MPEG-DASH. If 90% of the requests received by edge server 125 are based on the Microsoft Smooth Streaming protocol and the remaining 10% are based on the MPEG-DASH protocol, then a high number of translations may occur. In order to increase system efficiency, edge server 125 may switch the translation such that requests are translated from MPEG-DASH to Microsoft Smooth Streaming so that only 10% of the requests need to be translated. In some implementations, when a threshold percentage (e.g., 51%) or number of requests needing to be translated is reached, edge server 125 may then adjust the translation as discussed above.

While the subject matter of this application has been particularly shown and described with reference to specific implementations thereof, it will be understood by those skilled in the art that changes in the form and details of the disclosed implementations may be made without departing from the spirit or scope of the invention. Examples of some of these implementations are illustrated in the accompanying drawings, and specific details are set forth in order to provide a thorough understanding thereof. It should be noted that implementations may be practiced without some or all of these specific details. In addition, well known features may not have been described in detail to promote clarity. Finally, although various advantages have been discussed herein with reference to various implementations, it will be understood that the scope of the invention should not be limited by reference to such advantages. Rather, the scope of the invention should be determined with reference to the appended claims.

What is claimed is:

1. A computer implemented method, comprising:
receiving, by an edge server of a content distribution network (CDN), a first request based on a first streaming protocol from a first client device for playback of media content by a media delivery service, the first request indicating a fragment of the media content by referencing a first indexing type specified by the first streaming protocol;
determining, by the edge server, that the fragment is not in a cache of the edge server;
requesting, by the edge server, a copy of the fragment from an origin server;
receiving, by the edge server, the copy of the fragment from the origin server;
storing, by the edge server, the copy of the fragment in the cache;
providing, by the edge server, the first client device the copy of the fragment;
receiving, by the edge server, a second request based on a second streaming protocol from a second client device for playback of the media content by the media delivery service, the second request indicating the fragment by referencing a second indexing type specified by the second streaming protocol;
translating, by the edge server, a format of the second request into a format of the first request by converting the second indexing type to the first indexing type by using a first manifest associated with the first streaming protocol and a second manifest associated with the second streaming protocol, the first manifest associating the fragment with the first indexing type and the second manifest associating the fragment with the second indexing type;
determining, by the edge server, that the fragment indicated by the second request corresponds to the copy of the fragment in the cache as a cached fragment responsive to the translation; and
providing, by the edge server, the second client device a copy of the cached fragment.

2. The method of claim 1, wherein the first indexing type and the second indexing type are selected from the group consisting of time indexing, memory indexing, and fragment indexing, wherein the first indexing type and the second indexing type are different indexing types.

3. The method of claim 1, wherein providing the copy of the fragment in the cache includes packaging the copy of the fragment in the cache with a header according to the second streaming protocol.

4. The method of claim 1, further comprising:
determining, by the edge server, a cache key associated with the first request, the cache key based on the format of the first request; and
associating the cache key with the copy of the fragment in the cache, wherein the determination that the fragment is not in a cache of the edge server and the determination that the fragment indicated by the second request corresponds to the copy of the fragment in the cache are based on the association of the cache key with the copy of the fragment in the cache.

5. A computing device, comprising:
one or more processors and memory configured to:
receive a first request according to a first streaming protocol for playback of media content, the first request indicating a fragment of the media content;
translate the first request from the first streaming protocol to a second streaming protocol;
determine an identifier associated with the fragment based on the second streaming protocol, and
provide a copy of the fragment for playback based on the identifier.

6. The computing device of claim 5, wherein the first streaming protocol indicates the fragment using a first indexing type, and the second streaming protocol indicates the fragment using a second indexing type.

7. The computing device of claim 6, wherein the first indexing type and the second indexing type are selected from the group consisting of time indexing, memory indexing, and fragment indexing, wherein the first indexing type and the second indexing type are different indexing types.

8. The computing device of claim 5, wherein providing the copy of the fragment includes packaging the fragment with a first header according to the first streaming protocol.

9. The computing device of claim 8, wherein providing the copy of the fragment also includes packaging the fragment with a second header according to the second streaming protocol.

10. The computing device of claim 5, wherein the fragment is in a cache based on a previous request based on the second streaming protocol.

11. The computing device of claim 5, wherein translating the first request from the first streaming protocol to the second streaming protocol is based on a first manifest associated with the first streaming protocol and a second manifest associated with the second streaming protocol, the first manifest and the second manifest indicating fragments of the media content.

12. A computer program product, comprising one or more non-transitory computer-readable media having computer program instructions stored therein, the computer program instructions being configured such that, when executed by one or more computing devices, the computer program instructions cause the one or more computing devices to:
receive a first request associated with a first streaming protocol for playback of media content, the first request indicating a fragment of the media content;
translate the first request from the first streaming protocol to a second streaming protocol;
determine an identifier associated with the fragment based on the second streaming protocol, and
provide a copy of the fragment for playback based on the identifier.

13. The computer program product of claim 12, wherein the first streaming protocol indicates the fragment using a first indexing type, and the second streaming protocol indicates the fragment using a second indexing type.

14. The computer program product of claim 13, wherein the first indexing type and the second indexing type are selected from the group consisting of time indexing, memory indexing, and fragment indexing, wherein the first indexing type and the second indexing type are different indexing types.

15. The computer program product of claim 12, wherein providing the copy of the fragment includes packaging the fragment with a first header according to the first streaming protocol.

16. The computer program product of claim 15, wherein providing the copy of the fragment also includes packaging the fragment with a second header according to the second streaming protocol.

17. The computer program product of claim 12, wherein the fragment is in a cache based on a previous request based on the second streaming protocol.

18. The computer program product of claim 12, wherein translating the first request from the first streaming protocol to the second streaming protocol is based on a first manifest associated with the first streaming protocol and a second manifest associated with the second streaming protocol, the first manifest and the second manifest indicating fragments of the media content.

19. A computer program product, comprising one or more non-transitory computer-readable media having computer program instructions stored therein, the computer program instructions being configured such that, when executed by one or more computing devices, the computer program instructions cause the one or more computing devices to:
receive a request associated with a first streaming protocol for playback of media content, the request indicating a fragment of the media content;
determine a first cache key associated with the fragment based on the first streaming protocol and a second cache key associated with the fragment based on a second streaming protocol;
associate a copy of the fragment in a cache as a cached fragment with the first cache key and the second cache key; and
provide a copy of the cached fragment for playback.

20. The computer program product of claim 19, wherein the first streaming protocol indicates the fragment using a first indexing type, and the second streaming protocol indicates the fragment using a second indexing type.

* * * * *